(12) United States Patent
Rossini

(10) Patent No.: US 8,937,701 B2
(45) Date of Patent: Jan. 20, 2015

(54) WAVE FRONT ANALYZER HAVING LIQUID-CRYSTAL MICROLENSES

(75) Inventor: Umberto Rossini, Coublevie (FR)

(73) Assignee: Commissariat a l'energie Atomique et aux Energies Alternatives, Paris (FR)

( * ) Notice: Subject to any disclaimer, the term of this patent is extended or adjusted under 35 U.S.C. 154(b) by 207 days.

(21) Appl. No.: 13/808,002

(22) PCT Filed: Jul. 4, 2011

(86) PCT No.: PCT/EP2011/061181
§ 371 (c)(1),
(2), (4) Date: Jan. 2, 2013

(87) PCT Pub. No.: WO2012/004213
PCT Pub. Date: Jan. 12, 2012

(65) Prior Publication Data
US 2013/0107196 A1 May 2, 2013

(30) Foreign Application Priority Data

Jul. 6, 2010 (FR) ...................................... 10 02835

(51) Int. Cl.
*G02F 1/13* (2006.01)
*G02F 1/1335* (2006.01)
*G01J 9/00* (2006.01)

(52) U.S. Cl.
CPC *G02F 1/1313* (2013.01); *G01J 9/00* (2013.01)
USPC .............................. 349/199; 345/200; 345/95

(58) Field of Classification Search
CPC .................... G02F 1/133345; G02F 1/133382;
G02F 1/29; G02F 2001/294; G02F 2203/28;
G02F 1/133526; G02F 1/133621; G02F
1/133512; G01K 11/165
USPC ........................................... 349/199, 200, 95
See application file for complete search history.

(56) References Cited

U.S. PATENT DOCUMENTS 6,115,126 A * 9/2000 Chen et al. ..................... 356/520

OTHER PUBLICATIONS

Guoqiang Li, et al., "Switchable Electro-Optic Diffractive Lens With High Efficiency for Ophthalmic Applications", www.pnas.org, Apr. 18, 2006, pp. 6100-6104, vol. 103, No. 16, College of Optical Sciences, University of Arizona, Tucson, AZ.

(Continued)

*Primary Examiner* — Mike Qi
(74) *Attorney, Agent, or Firm* — Baker Hostetler LLP

(57) ABSTRACT

A wavefront analyzer comprises a network of adjustable converging microlenses dividing an incident wavefront into multiple beams and creating a respective focal point for each beam, and a network of light-sensitive detectors placed behind to detect positions of these focal points. The microlenses network is formed from a liquid crystal layer operating in transmission with an array of electrodes forming liquid crystal pixels whose refractive index is controllable by a voltage applied individually to each electrode. Each converging microlens comprises a subset of pixels grouped in a region constituting the microlens, the pixels of a subset having indices that vary radially in a monotonic manner by distance from a central point of the region to its edges, enabling the microlens to operate in refractive mode. The number, position, size and focal length of the microlenses can be adjusted by the profile of the voltages applied to the array of pixels.

11 Claims, 5 Drawing Sheets

(56) References Cited

OTHER PUBLICATIONS

Hyuck Choo, et al., "Addressable Microlens Array to Improve Dynamic Range of Shack-Hartmann Sensors", Journal of Microelectromechanical Systems, Dec. 6, 2006, pp. 1555-1567, vol. 15, No. 6.

L. Hu, et al., "Wavefront Correction Based on a Reflective Liquid Crystal Wavefront Sensor", Journal of Optics A: Pure and Applied Optics, Dec. 30, 2008; pp. 1-6, vol. 11, IOP Publishing Ltd., Peoples Republic of China.

L. Seifert, et al., "The Adaptive Shack-Hartmann Sensor", Optics Communications, May 27, 2002; pp. 313-319, www.sciencedirect.com, Stuttgart, Germany.

Mao Ye, et al., "Properties of Variable-Focus Liquid Crystal Lens and Its Application in Focusing System", Optical Review, Jan. 15, 2007, pp. 173-175, vol. 14, No. 4, Akita, Japan.

Larry N. Thibos, et al., "Use of Liquid-Crystal Adaptive-Optics to Alter the Refractive State of the Eye", Optometry and Vision Science, Jul. 1997, pp. 581-587, vol. 74, No. 7, Bloomington, Indiana.

Quanquan Mu, et al., Adapative Optics Imaging System Based on a High-Resolution Liquid Crystal on Silicon Device, Optics Express 8013, Sep. 4, 2006, pp. 8013-8018, vol. 14, No. 8, Beijing, China.

S. Sinzinger, et al., "Transition Between Diffractive and Refractive Micro-Optical Components", Applied Optics, Sep. 10, 1995, pp. 5970-5976, vol. 34, No. 26, Hagen, Germany.

SMO Techinfo Sheet 11—Shack Hartmann Wavefront Sensors, Suss MicroOptics, Jan. 2008, pp. 1-4, Version: 2008-1.0, www.suss-microoptics.com.

* cited by examiner

US 8,937,701 B2

WAVE FRONT ANALYZER HAVING LIQUID-CRYSTAL MICROLENSES

CROSS-REFERENCE TO RELATED APPLICATIONS

This application is a National Stage of International patent application PCT/EP2011/061181, filed on Jul. 4, 2011, which claims priority to foreign French patent application No. FR 1002835, filed on Jul. 6, 2010, the disclosures of which are incorporated by reference in their entirety.

FIELD OF THE INVENTION

The invention relates to optical wavefront analyzers.

A wavefront analyzer has a network of converging microlenses which divide an incident wavefront into multiple beams, each microlens focusing a beam at a respective focal point. A network of photosensitive detectors (an array of CCD or CMOS sensors) is placed behind the network of microlenses in order to detect the position of the focal point for each beam. This position depends on the local deformations of the wavefront facing each microlens.

BACKGROUND

Wavefront analyzers of this type are used, notably, for astronomical observation in telescopes; for example, when a star is observed, the Earth's atmosphere deforms the plane wavefront emitted by the star and the deformation is measured; the detected deformation can be used to correct the aberrations and restore a plane wavefront.

They are also used for making ophthalmological measurements for the purpose of correction or remedial surgery.

The microlenses used in these analyzers are most commonly fixed-focus converging glass lenses which offer no flexibility in use.

Analyzers using networks of programmable microlenses have also been proposed. In these analyzers, the optical characteristics of the microlenses can be adjusted by regulating voltages.

In particular, the use of networks of microlenses formed from arrays of liquid crystal pixels has been proposed. The article "Wavefront correction based on a reflective liquid crystal wavefront sensor", in Journal of Optics A: Pure and Applied Optics 11 (2009), by L Hu, L Xuan, D Li, Z Cao, Q Mu, Y Liu, Z Peng, and X Lu, describes a solution of this type. However, this solution is based on a liquid crystal array operating by reflection, which complicates the structure of the analyzer. Furthermore, it is difficult to adjust the focal length, because this is highly dependent on the wavelength of the incident light.

SUMMARY OF THE INVENTION

The object of the invention is to propose a wavefront analyzer which is more efficient and simple to produce and use, and in which each individual microlense can easily be adjusted in respect of their position, size, or focal length.

Thus the invention proposes an optical wavefront analyzer comprising a network of converging microlenses for dividing an incident wavefront into multiple beams and creating a respective focal point for each beam, and a network of light-sensitive detectors placed behind the network of microlenses to detect the positions of these focal points, characterized in that the network of microlenses is formed from a liquid crystal layer operating in transmission and provided with an array of electrodes forming liquid crystal pixels whose refractive index is controllable by a voltage applied individually to each electrode, and in that each converging microlens comprises a subset of liquid crystal pixels grouped in a region constituting the microlens, the pixels of a subset having refractive indices that vary radially in a monotonic manner as a function of the distance from a central point of the region to the edges of the region.

There are no substantial refractive index steps, and therefore no abrupt phase steps in the optical paths in a microlens; there are only the small index steps caused by the discrete nature of the electrodes. The ratio of the thickness of the liquid crystal to the size of the electrodes can be adjusted in such a way that the transverse fields make the index variation virtually continuous. The microlens therefore operates in refractive mode, not in diffractive mode.

Since microlenses operate in a refractive manner, the focal length varies with the wavelength only to the extent that the liquid crystal has a partially dispersive nature; in the article cited above, the lenses are formed by diffractive networks, and the focal length is therefore highly dependent on the wavelength of the light.

The index of the liquid crystal varies in a monotonic manner with the voltage applied to the pixel, in such a way that the pattern of voltages applied to the pixels of a sub-network also varies radially in a monotonic manner from the centre to the edge of a microlens; it is the pattern of voltages, and therefore the distribution pattern of the refractive indices of the liquid crystal layer in the sub-network of pixels making up a microlens, that determines the properties of the microlens in respect of dimensions, position, and focal length.

The distribution of the voltages applied to the electrodes has N maxima, defining central points of N microlenses (N>1), and has a monotonic variation from a central point of the microlens to the edges of the region in all directions. In a nematic liquid crystal, the voltages decrease or increase from the center toward the edges, depending on the nature and alignment of the liquid crystal.

The central point of the region, corresponding to one subset and forming an individual microlens, is theoretically a geometrical center of the subset of electrodes, but, as will be seen, in individual cases the central point may be offset relative to the geometrical center of the subset, when it is desirable for the focal point not to be on the axis perpendicular to the liquid crystal layer.

The network of microlenses theoretically consists of microlenses adjacent to one another; in other words, the edges of the region forming one converging microlens are adjacent to the edges of regions forming other converging microlenses. However, as will be seen, it is possible, by appropriately controlling the voltages applied to the array, to cause each converging microlens to be separated from the other converging microlenses by regions which have no converging power or which have a diverging power.

In the case of a network of converging lenses, if r denotes the radial distance of one pixel from the center of the microlens, F is the desired focal length, and E is the thickness of the liquid crystal, it is preferable to apply to the pixel a voltage such that the mean refractive index n(r) of the pixel is equal to $n=n_1-r^2/2E\cdot F$, where $n_1$ is the index at the center. The voltages to be applied to a pixel to obtain a given index value are determined from the curve of variation of the mean index as a function of the applied voltage, and this curve depends on the nature and thickness of the liquid crystal. For a diverging lens, the variation would preferably be $n=n_1+r^2/2E\cdot F$.

In addition to the analyzer briefly described above, the invention also proposes a method of analyzing a wavefront on the basis of a network of photosensitive detectors and a liquid crystal layer associated with an array of electrodes and means for applying individual voltages to the different electrodes, characterized in that:

the network of detectors is placed at a distance F behind the liquid crystal layer in the direction of propagation of the wavefront toward the liquid crystal layer, the voltages applied to the individual electrodes of a region comprising a subset of electrodes grouped around a central point vary according to a monotonic curve as a function of the distance of the electrodes from this central point, and the subset is adjacent at all of its edges to other subsets organized and controlled in the same way by voltages varying according to a monotonic curve;

each subset acts on an incident light beam which is collimated to make it converge on a focal point located at the distance F, and the positions of the focal points of the subsets are detected with the aid of the network of detectors.

The number N of microlenses, the position of the centre of each microlens, the size of the microlenses, the focal length, and even the focusing axis of the lens can be adjusted by varying the pattern of voltages applied to the electrodes of the array.

BRIEF DESCRIPTION OF THE DRAWINGS

Other features and advantages of the invention will be revealed by the following detailed description which refers to the attached drawings, of which.

DETAILED DESCRIPTION

Firstly, the behavior of light passing through a medium having a transverse refractive index gradient will be recalled. If the index gradient strictly followed the direction of propagation of the light, there would be no change in the direction of propagation. But if the index gradient has a transverse component, perpendicular to the direction of propagation, this direction of propagation tends to be modified, with the trajectory bending toward the side with the highest index; the radius of curvature R at a given point is proportional to the refractive index n at this point and inversely proportional to the transverse component of the gradient at this point; this is expressed by the formula:

$$\frac{1}{R} = \frac{1}{n}\vec{e_n} \cdot \overrightarrow{grad}(n)$$

where $\vec{e_n}$ is the unit vector perpendicular to the direction of propagation at one point, and $\overrightarrow{grad}(n)$ is the index gradient vector. The scalar product $\vec{e_n} \cdot \overrightarrow{grad}(n)$ represents the transverse component of the gradient, perpendicular to the propagation.

Consequently, if a light ray passes through a flat liquid crystal layer whose mean refractive index varies transversely in the plane of the layer, the deflection of the rays increases with an increase in the gradient and also with a decrease in the index. This deflection is also a progressive bending of the path of the light, such that the angle α between the propagation direction at the input and the propagation direction at the output depends on the thickness E of the liquid crystal layer.

Figure 1:
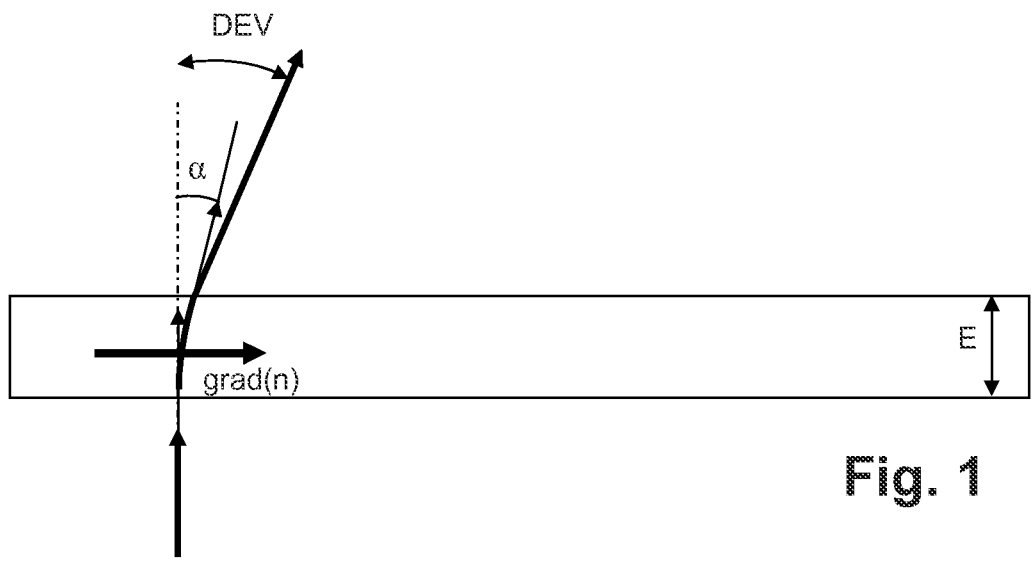
FIG. 1 shows a diagram of the refractive behavior of a liquid crystal layer having a transverse index gradient in the plane of the layer.

FIG. 1 shows schematically the deflection of a ray caused by the presence of an index gradient grad(n) in the horizontal plane of the layer. The distances and angles are exaggerated to illustrate the phenomenon more clearly.

It should be noted that an additional deflection occurs at the output of the layer because of the change of index at the transition from the inside to the outside of the liquid crystal. The total deflection between the input path (perpendicular to the layer) and the output path is indicated by the angle DEV.

Simplifying the calculations in order to give an intuitive picture of the behavior, we can say that the deflection angle DEV between the ray entering the layer and the ray leaving it is substantially proportional to the thickness E of the layer and to the transverse index gradient at the point in question. The index considered here is the mean index of the crystal layer over the thickness of the crystal layer, since the index is not necessarily constant in the direction perpendicular to the layer.

Figure 2:
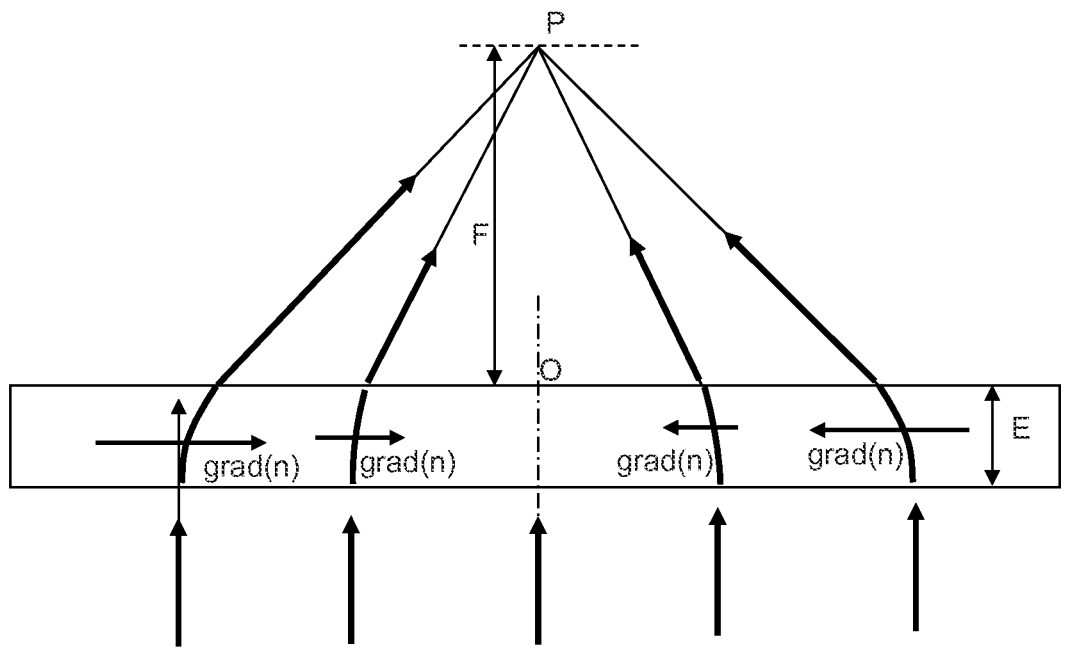
FIG. 2 shows a diagram illustrating the way in which a converging lens can be made from a layer of this type by providing a controlled transverse variation of the index in the plane of the layer.

FIG. 2 shows how a converging lens can be produced if the mean transverse index of the liquid crystal can be controlled at every point in the layer. The arrangement is such that a high gradient is produced at the periphery of the crystal region acting as a lens, while the gradient decreases toward the center. The different gradients grad(n) are indicated by arrows of different length. The light rays are therefore deflected more strongly by the layer at the periphery and are deflected to a lesser extent at the center. The directions of the gradients point toward the center of the lens; in other words, the indices increase from the edges toward the center. If the deflections (including the deflection at the output of the layer, which itself depends on the local index) are calculated so that they all converge toward a focal point P at a distance F from the lens, a converging lens is formed with a flat liquid crystal layer having an index gradient.

The mean index gradient is controlled electrically by setting a desired mean index n in each elementary region of the layer, the index varying as a function of the position of this region relative to the center O of the lens. The index is itself controlled by a chosen electrical field which modifies the orientation of the molecules of the liquid crystal, thus creating an index change. Individual juxtaposed electrodes (not shown) can receive individual electrical potentials, making it possible to apply desired electrical fields which vary from one electrode to another. Because of the manufacturing technology used, these electrodes cannot be infinite in number. The layer is therefore divided into a finite number of elementary regions which are individually controllable. These regions will be referred to as pixels, by analogy with liquid crystal display units which are constructed in this way with a network of individual electrodes delimiting the pixels of the image to be displayed.

By simplifying the calculations again, we can show that a converging lens can be formed if the mean index of the elementary regions of the layer can be given a variation of the form $n(r)=n_1-r^2/2E\cdot F$, as a function of the radial distance r between the center O of the lens and the elementary region, where $n_1$ is the index at the center. Specifically, this variation is used to provide variations of gradient which create the converging deflections shown in FIG. 2. The distribution of indices along the liquid crystal layer therefore depends on the thickness of the layer and the desired focal length.

A diverging lens could be produced in the same way by inverting the sign of the gradients, in other words by making the index increase from the center toward the edges, instead of from the edges toward the center.

Figure 3:
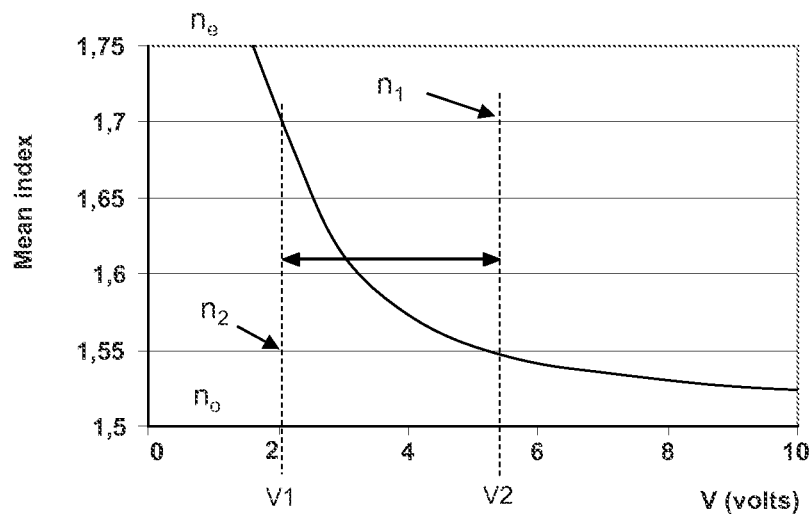
FIG. 3 shows a curve of the relationship between the voltage to be applied to a pixel and the mean refractive index resulting therefrom.

By way of example, FIG. 3 shows a curve of the relationship between the voltage V applied perpendicularly to the liquid crystal layer and the resulting mean index n at the point where this voltage is applied. The index varies between two extreme values, namely an ordinary index $n_O$ and an extraordinary index $n_e$. This curve is only an example, since it essentially depends on the form of construction and the nature and thickness of the liquid crystal. However, it shows that a voltage can be associated in a one-to-one way with an index, making it possible to determine, for a liquid crystal layer of a given nature and thickness, the pattern of voltages to be applied to the various pixels as a function of their distance from the center, in order to obtain the desired index for each pixel and form a converging (or diverging) lens.

Figure 4:
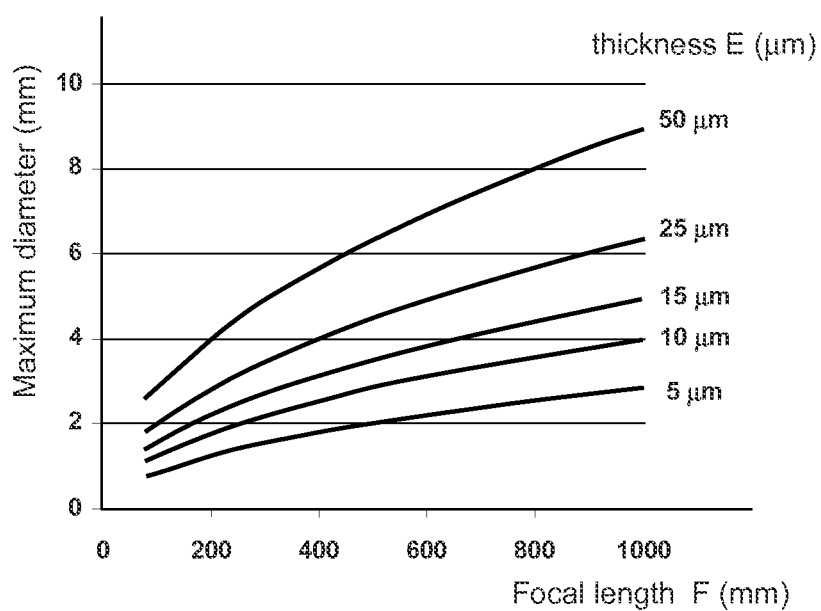
FIG. 4 shows a set of curves showing the maximum diameter of a refractive microlens as a function of the desired focal length, for different thicknesses of liquid crystal.

To enable the device to be constructed, it is desirable to operate within a range of voltages such that a variation of voltage gives rise to a significant variation of the index, in other words not too close to the lower part of FIG. 3. Operation near the threshold voltage of the liquid crystal should also be avoided, since the reaction time of the latter increases greatly if attempts are made to vary the index to a small extent near this voltage. Finally, the thickness of the liquid crystal is specified in accordance with the required focal length and the desired diameter of the microlenses. FIG. 4 shows curves illustrating the relationship between the thickness of the liquid crystal, the focal length, and the desired diameter of the microlenses. Thus a thickness and a range $n_1$, $n_2$ of acceptable variation of the index are chosen, together with a corresponding control voltage range V1, V2.

In the example of a curve shown for a liquid crystal whose index can vary by dn=0.25 (from 1.5 to 1.75), it is considered that a range of index variation from 1.55 to 1.7 can be obtained, in other words an index variation dn of 0.15, with voltages of 2 to 6 volts for a liquid crystal thickness of 10 micrometers. By keeping the value of n below 1.70, a correct reaction speed is maintained, and by keeping the value of n above 1.55 a reasonable operating voltage is maintained.

The lenses proposed in the prior art based on this principle of controlling the liquid crystal index with a network of electrodes are diffracting lenses. They are configured with successive regions in which the optical paths undergo abrupt phase steps of $2\pi$ at the transition point between two successive regions. One of the reasons for using diffracting lenses is that they allow a lens diameter and a desired convergence (or focal length) to be chosen at will and independently of one another. Diffracting lenses based on the use of liquid crystals not only have phase steps but also refractive index steps; it is difficult to produce these lenses unless electrodes in the form of concentric rings of decreasing radial width, of the Fresnel lens type, are used, as described for example in the paper "Switchable electro-optic diffractive lens with high efficiency for ophthalmic applications" by Guoqiang Li, David L. Mathine, Pouria Valley, Pekka Ayras and others, in O+PNAS, Apr. 18, 2006, Vol. 103, No. 16. Their geometry is therefore fixed by the geometry of the electrodes.

According to the invention, in a wavefront analyzer application using a network of microlenses, it has been found that it is preferable to avoid using diffracting lenses. On the one hand, diffracting lenses have the drawback of having a focal length dependent on the wavelength, while, on the other hand, they require concentric ring electrodes if they are to be effective. It has been found that, in contrast with other applications such as ophthalmological correction, application to a wavefront analyzer allows microlenses with diameters of several hundred micrometers to be used for focal lengths of several millimeters. These microlenses can be microlenses operating in a refracting mode rather than a diffracting mode.

This is why it is proposed to form a set of microlenses in an array of liquid crystal pixels, the microlenses having the distinctive property that each of them has an index profile varying radially in a monotonic manner between the center and the edges of the microlens. These lenses operate in a refracting mode rather than in a diffracting mode. Also, the microlenses are used in transmission mode, the reflection mode being less suitable for the application of wavefront analysis because it requires mirrors and secondary optics between the network of microlenses and the image sensor which detects the focal points of the wavefront after its passage through the network of microlenses.

Figure 5:
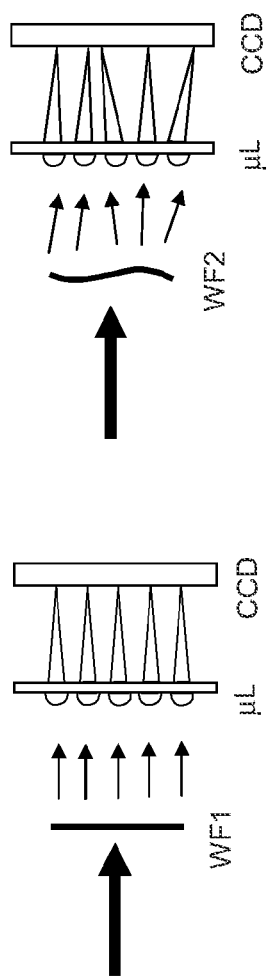
FIG. 5 shows the general principle of a wavefront analyzer having a network of microlenses.

FIG. 5 shows the general principle of a wavefront analyzer having a network of microlenses; in the prior art, the lenses of an analyzer of this type are usually made of glass. Analyzers of this type are used for measurements in ophthalmology (for measuring eye defects) and for space observation, for adjusting optics. In space observation, wavefront measurements are used to correct the aberrations arising from wavefront deformations; such deformations are caused, notably, by the passage of light rays through the layers of the atmosphere.

The left-hand part of FIG. 5 shows the operation of the analyzer in the presence of a plane wavefront; the right-hand part shows this operation when the wavefront is deformed. The incident light beam with a plane wavefront WF1 passes through a network of juxtaposed microlenses (µL); the microlenses divide the beam into multiple sub-beams and each of them focuses a respective sub-beam on an electronic image sensor (based on CCD or CMOS technology). The microlenses are distributed in a regular geometric network in such a way that the focal points are distributed in a regular network on the image sensor.

When a light beam arrives with a non-plane wavefront WF2 (shown on the right-hand side of FIG. 5), the focal point of each microlens is shifted as a function of the local inclination of the wavefront before each microlens. The image sensor supplies the image of an irregular network of focusing spots. The deformation of the network of focusing spots depends on the deformation of the wavefront at each of its points. It can be used to reconstruct the shape of the wavefront.

Figure 6:
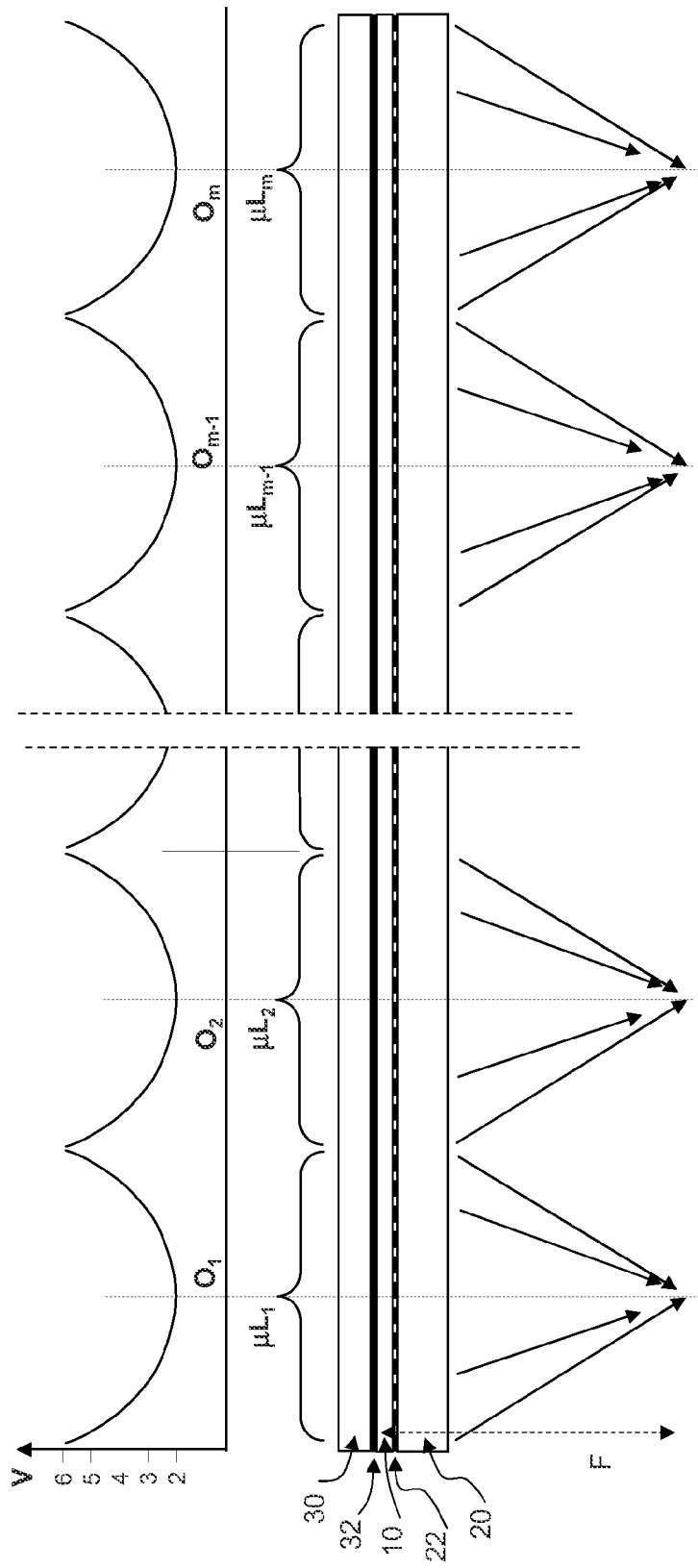
FIG. 6 shows the structure of the network of microlenses according to the invention with a diagram of the distribution of the voltages applied to the electrodes of the pixel array as a function of their position in the array.

FIG. 6 shows a cross-sectional view of the network of microlenses produced according to the invention. It is preferably manufactured by what are known as LCOS ("liquid crystal on silicon") technologies, in other words microelectronics technologies used for integrated circuits in which silicon wafers are treated collectively before being cut into individual chips.

The network of microlenses comprises a liquid crystal layer 10 with a thickness E between two transparent plates (glass plates) 20 and 30. The plate 20 comprises a network in the form of an array of individually controllable electrodes 22 and the control circuits of these electrodes. The other plate 30 carries a counter electrode 32 which defines a zero reference potential. The electrodes of the array and the counter electrode are transparent to enable the network of microlenses to operate in transmission mode as shown in the diagram in FIG. 5. They are preferably made of indium-tin oxide (ITO).

The upper part of FIG. 6 shows the distribution of voltages to be applied to the individual electrodes of the array in order to form a network of converging microlenses. The voltage distribution is shown in the form of a smoothed curve, but in reality it is a stepped curve with a pitch corresponding to the pitch of the individual electrodes in the array. The smoothed voltage profile along the cross section comprises a sequence of bell curves (in an inverted configuration) whose peaks define the centers $O_1$, $O_2$, ... $O_{m-1}$, $O_m$ of the different microlenses $\mu L_1$, $\mu L_2$, ... $\mu L_{m-1}$, $\mu L_m$.

In the drawing, the microlenses are shown as if they were all identical and adjacent. When using the wavefront analyzer, however, it is possible to decide that the microlenses will not all be identical (in order to correct defects), or that they will be separated from one another by spaces without a converging function, or that one of every two microlenses will be diverging (when the pitch of the microlenses actually used by the analyzer is to be reduced), and so on. For example, it is possible to apply to the pixels of other subsets, forming diverging microlenses, a voltage such that the mean refractive index of the pixel is equal to $n_1 + r^2/2E \cdot F$, where $n_1$ is the index of the liquid crystal at the central point of a microlens, r is the radial distance from the pixel to this central point, F is the desired focal length, and E is the thickness of the liquid crystal.

The position of the center of each microlens can be controlled at will, since it is defined by the peaks of the various bell curves. The convergence of the microlens is defined by the shape of the bell curve as explained above: the simplified formula that describes the monotonic variation of the refractive index n as a function of the distance r to the center of a microlens is $n = n_1 - r^2/2E \cdot F$, where $n_1$ is the index at the center, E is the thickness of the layer, and F is the desired focal length. This monotonic variation is present in all directions, giving rise to the bell-shaped variation of the index along a diameter of the microlens and also the bell-shaped variation of the corresponding voltage shown in FIG. 6.

The diameter of the microlens is defined by the base of the bell curve. This diameter is limited by the range of indices that can be obtained between the voltage at the base of the curve and the voltage at the peak. If the index can vary by a maximum of $dn_{max}$, the maximum diameter of a microlens will be equal to $2 \times (2 \times dn_{max} E \cdot F)^{1/2}$. For example, if $dn_{max} = 0.15$, if E=10 micrometers, and if the desired focal length is 10 mm, the maximum diameter of a microlens will be approximately 350 micrometers.

The microlens is not necessarily circular; consequently, the term "maximum diameter" may also denote the maximum diagonal of a square. The diameter of the microlens is not necessarily equal to the maximum diameter.

In practice, either square or hexagonal microlenses will be used, making it possible to use all the pixels of the array when an array of microlenses which are all adjacent to one another is required; circular microlenses would leave unused pixels in the spaces between microlenses. The hexagon is a geometrical figure which can provide a good approximation to a circle without leaving any unused space between adjacent hexagons.

Figure 7:
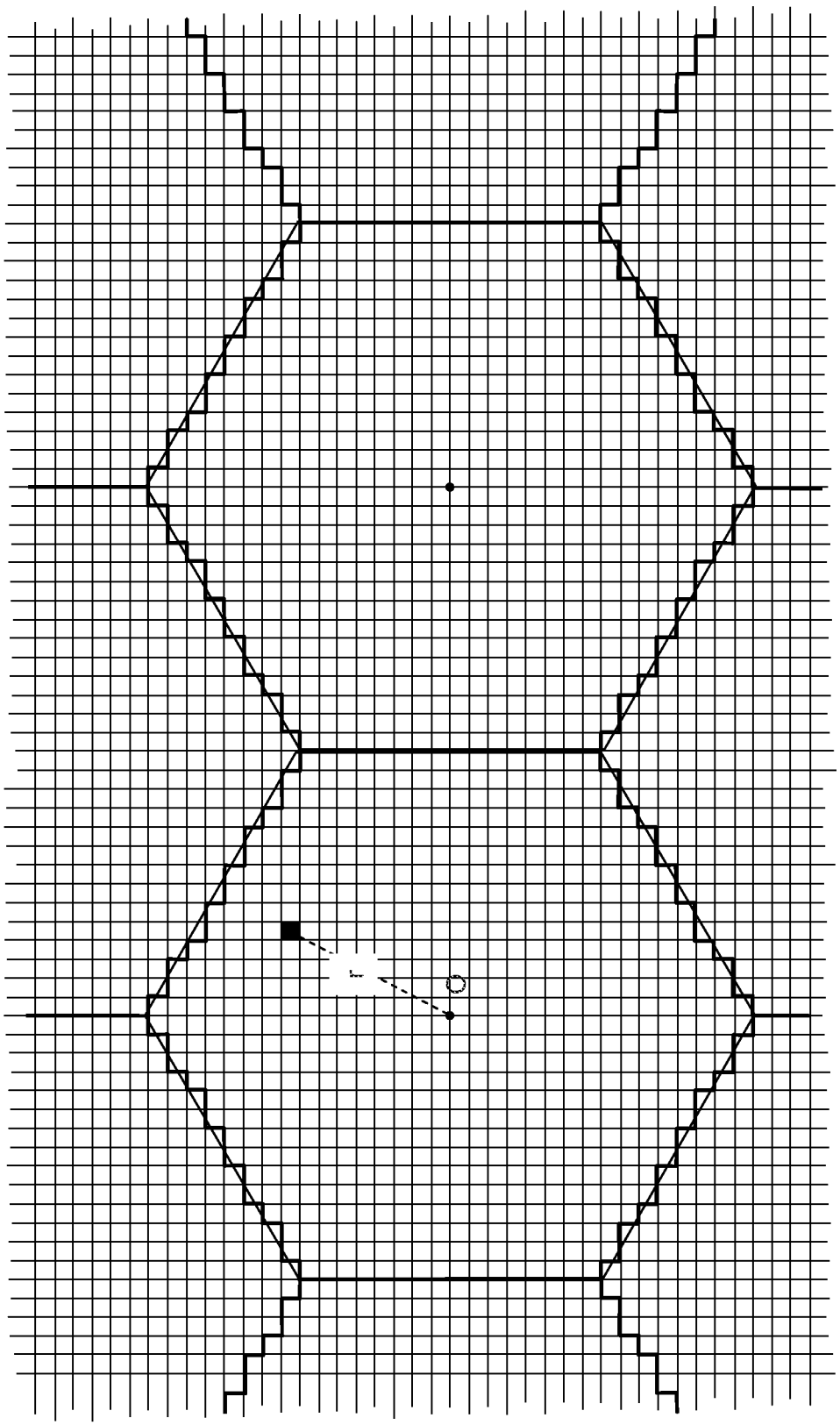
FIG. 7 shows, in a top view, a layout of a hexagonal lens based on a sub-network of 672 pixels.

FIG. 7 shows, in a top view, a configuration of hexagonal microlenses (formed by the application of a voltage profile according to the explanations given above) which are adjacent to one another. The array has pixels measuring 10 μm×10 μm. Each microlens has a diameter of approximately 320 μm, which is compatible with an index range of 0.15 for a liquid crystal thickness of 10 micrometers (controllable by voltages from 2 to 6 volts) and a focal length of approximately 10 mm. There are 672 pixels per microlens, with 28 to 32 pixels per diameter, and 28 to 32 voltages are therefore required to establish the desired index distribution in the bell curve defining this microlens. If the liquid crystal array is an array with several hundred pixels in each row and several hundred pixels in each column, a network of 100 to 200 microlenses can easily be formed on the array, which is satisfactory for a wavefront analyzer. An array of 600×800 pixels would enable 24×28 converging microlenses to be housed adjacent to one another.

For applications not requiring a very high frequency of analysis, it is also possible to increase the precision of analysis by multiplying the number of microlenses, with each pixel capable of acting as the center of one microlens. In this case, the microlenses overlap one another and can be addressed, for example, in a sequential way, in packets of non-overlapping microlenses.

It can be demonstrated that, if a microlens having the maximum permissible diameter is used with the bell-shaped voltage curve (with allowance for the usable index range), the Fresnel number of this microlens is proportional to the thickness of the liquid crystal and to the range of indices used.

It may be desirable for the Fresnel number to be higher or lower. The chosen liquid crystal thickness, the chosen index range, and the chosen diameter of the microlens can be adapted according to whether it is desirable to have a greater or lesser focusing accuracy, a longer or shorter focal length, or a higher or lower control speed for the array. For example, a greater thickness would allow shorter focal lengths, but would reduce the reaction speed of the liquid crystal. On the other hand, insufficient thickness causes a more pronounced "pixelation" of the index variations (the steps found in the variation curve between one electrode and the next), while a greater thickness tends to smooth out the variations and establishes gradients closer to those required in order to implement the convergence function.

Since the index gradients allow the inclination of the rays to be regulated at all points, the array can be used to make supplementary adjustments. These adjustments consist in a slight modification of the bell curve to make it asymmetric and thus offset the focal point of the lens relative to the central geometrical axis of symmetry of the subset of pixels forming the microlens.

This makes it possible, for example, to offset laterally the focal points of all the microlenses by the same distance; this may be useful if the alignment of the microlens array is to be adjusted electrically relative to the image sensor of the analyzer. In this case, the bell curves have asymmetric shapes which are all identical, and the focal points are all offset laterally by the same amount relative to the axis of symmetry of the microlenses.

It is also possible to create variable asymmetry in the bell curves of the different microlenses. In one example, the bell curve of a microlens located in the center of the array is symmetrical and the asymmetry of the curves of the other microlenses increases with distance from the central microlens. In this way it is possible, for example, to form a network of focal points which are more widely spaced than the centers of the microlenses.

As a general rule, in cases where this type of adjustment is made, the central point of the converging microlens, in other words the point corresponding to the peak of the bell curve, is not the geometrical center of the subset of pixels forming the microlens.

Figure 8:
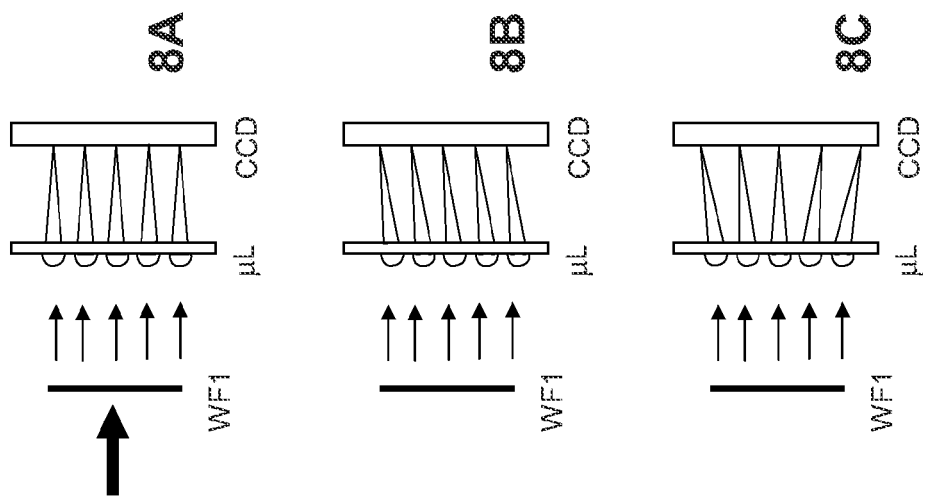
FIG. 8 shows possible ways of adjusting the microlens formation to obtain certain effects.

FIGS. 8 (A, B, C) is a symbolic illustration of these possible adjustments of the convergence functions of the different microlenses: in 8A there is no particular adjustment; in 8B there is adjustment with offsetting of the alignment; and in 8C there is adjustment with modification of the pitch of the network of focal points relative to the pitch of the microlenses. The symbol "CCD" denotes the network of photosensitive detectors placed downstream of the transmissive pixel array, which can detect the variations of the positions of the focal points of the different microlenses where there is a deformation of the wavefront of the incident light.

Figure 9:
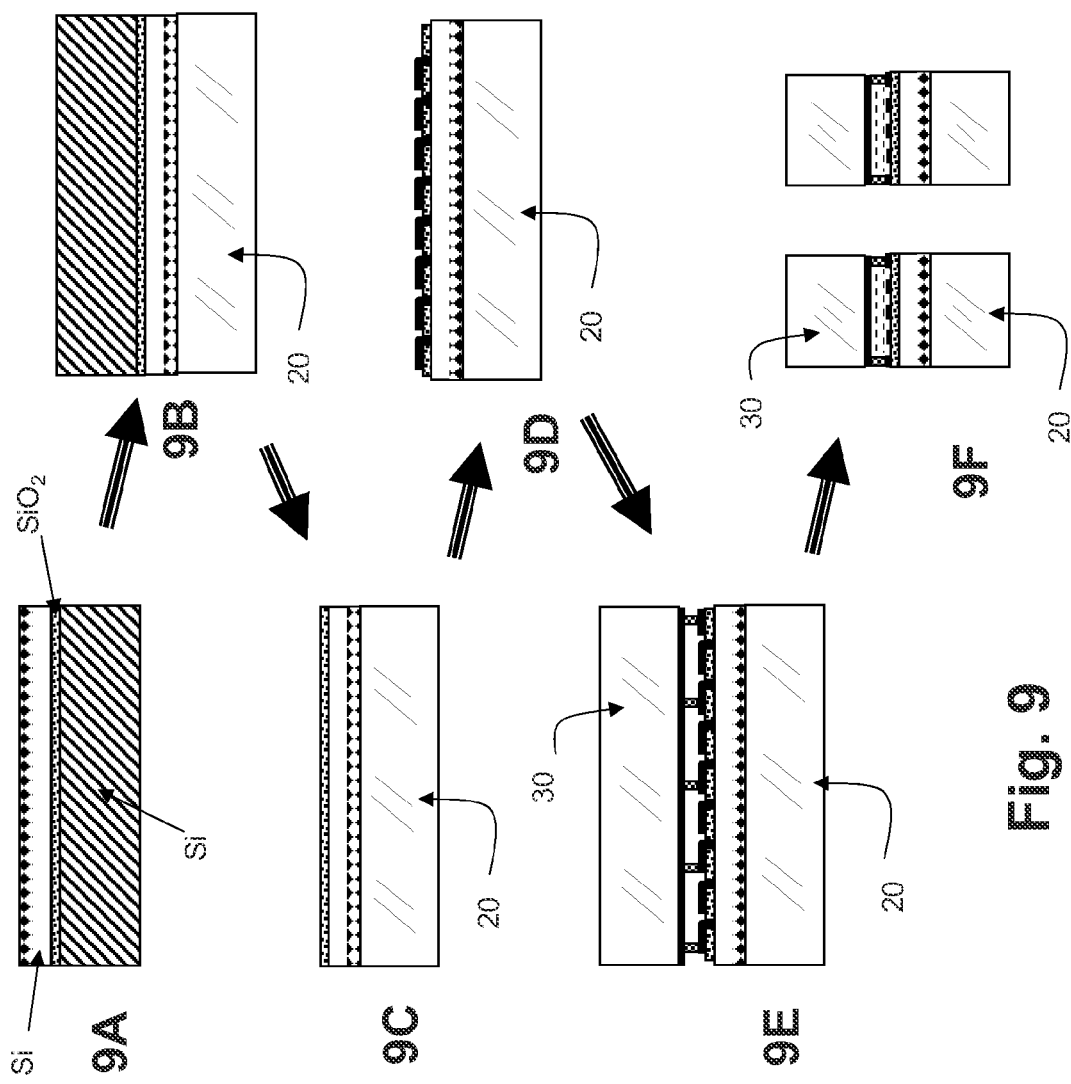
FIG. 9 shows the main steps in the manufacture of an array of liquid crystal pixels operating in transmission mode.

The array of pixels is preferably constructed in the following manner, as shown in FIG. 9.

The starting point is a silicon wafer, preferably of the SOI (silicon on insulator) type, in other words a silicon substrate coated on its front surface with a fine layer of silicon oxide, which is itself coated with a fine epitaxial layer of silicon having a thickness of a few micrometers. Manufacturing takes place collectively for a set of arrays, but the present description is only concerned with one array. An array of active pixels is formed in the epitaxial layer, via the front surface of the latter, as would be done for an LCOS display device, including control transistors and capacitors and the necessary interconnections (FIG. 9A).

The front surface of the wafer is then laid on the front surface of a glass plate 20 (FIG. 9B).

All of the silicon substrate is removed from the rear surface of the wafer until the fine oxide layer is exposed. This removal is carried out by mechanical and/or chemical machining (FIG. 9C).

All that remains on the glass plate 20 is a fine epitaxial silicon layer, in which all the pixel control circuits and electrodes have been formed, and whose rear surface is coated with the fine oxide layer of the SOI substrate.

The rear surface is then treated by a process including the formation of conductive vias through this oxide layer for access to the interconnection layers, followed by the deposition and etching of a network of individual electrodes (FIG. 9D).

This rear surface of the wafer is then laid on a second glass plate 30 which carries a counter-electrode, a fixed spacing being provided between the two plates (FIG. 9E). This spacing will define the desired thickness E of the liquid crystal.

Finally, the wafer is cut into individual chips, and the space between the glass plates is filled with liquid crystal 10 (FIG. 9F).

The assembly is fitted in a support casing which allows the array to be connected to the exterior.

It should be noted that the array of pixels tends to create undesired diffraction, because it forms a regular network of transparent and opaque regions having the same pitch as the pixels. This diffraction may cause parasitic points of light, which are not the true focal points whose positions represent the wavefront, to appear on the network of detectors. In order to limit this parasitic diffraction as far as possible, it is desirable to arrange for the pixels of the array to have a number of different configurations, so that they are not all identical, and to distribute the different configurations in a pseudo-random manner in the array. Thus, even if the pixels are arranged with a regular pitch, the fact that they have a number of different configurations reduces the diffraction peaks caused by the regularity of the pitch.

For example, the control transistor associated with each pixel for controlling the liquid crystal can be placed in different positions in the pixel, such as the lower left, lower right, upper left, upper right, or lower central position, among others. These different positions are distributed irregularly (in a pseudo-random manner) in the array. The fact that the transistor forms an opaque region of the pixel and has a different position helps to reduce the diffraction peaks.

The invention claimed is:

1. An optical wavefront analyzer, comprising: a network of converging microlenses for dividing an incident wavefront into multiple beams and creating a respective focal point for each beam, and a network of light-sensitive detectors placed behind the network of microlenses to detect the positions of these focal points, wherein the network of microlenses is formed from a liquid crystal layer operating in transmission and provided with an array of electrodes forming liquid crystal pixels whose refractive index is controllable by a voltage applied individually to each electrode, and each converging microlens comprises a subset of pixels grouped in a region constituting the microlens, the pixels of a subset having indices that vary radially in a monotonic manner as a function of the distance from a central point of the region to the edges of the region, thus enabling the microlens to operate in refractive mode.

2. The wavefront analyzer as claimed in claim 1, wherein the distribution of the voltages applied to the electrodes has N maxima, defining central points of N microlenses (N>1), and has a monotonic radial variation from a central point of each microlens to the edges of the region.

3. The analyzer as claimed in claim 2, wherein the applied voltages increase from the center toward the edges.

4. The analyzer as claimed in claim 1, wherein the central point is a geometrical center of the subset of electrodes.

5. The analyzer as claimed in claim 1, wherein the central point is offset relative to a geometrical center of the subset of electrodes.

6. The analyzer as claimed in claim 1, wherein the edges of the region forming one converging microlens are adjacent to the edges of regions forming other microlenses.

7. The analyzer as claimed in claim 1, wherein the regions forming the converging microlenses are adjacent to diverging regions or regions having no converging power.

8. The analyzer as claimed in claim 1, wherein the pixels of the array have a number of different configurations, and the different configurations are distributed in a pseudo-random manner in the array.

9. A method of analyzing a wavefront on the basis of a network of photosensitive detectors, a liquid crystal layer associated with an array of electrodes, and means for applying individual voltages to the different electrodes, wherein:

the network of detectors is placed at a distance F behind the liquid crystal layer in the direction of propagation of the wavefront toward the liquid crystal layer, the voltages applied to the individual electrodes of a region comprising a subset of electrodes grouped around a central point vary according to a monotonic curve as a function of the distance of the electrodes from this central point, and the subset is adjacent at all of its edges to other subsets organized and controlled in the same way by voltages varying according to a monotonic curve;

each subset acts on an incident light beam which is collimated to make it converge on a focal point located at the distance F, and the positions of the focal points of the subsets are detected with the aid of the network of detectors.

10. The method as claimed in claim 9, wherein a voltage is applied to a pixel, the voltage being such that the mean refractive index is equal to $n_1 - r^2/2E.F$, where $n_1$ is the index of the liquid crystal at the central point of a microlens, r is the radial distance from the pixel to this central point, F is the desired focal length, and E is the thickness of the liquid crystal.

11. The method as claimed in claim 10, wherein a voltage is applied to the pixels of other subsets forming diverging microlenses, the voltage being such that the mean refractive index is equal to $n_1 + r^2/2E.F$, where $n_1$ is the index of the liquid crystal at the central point of a microlens, r is the radial distance from the pixel to this central point, F is the desired focal length, and E is the thickness of the liquid crystal.

* * * * *